3,481,897
POLYOLEFINS CONTAINING A COMBINA-
TION OF ANTIOXIDANTS AND ULTRA-
VIOLET ABSORBERS
Paul J. Marinaccio, 100 Courtlandt Place, Tenafly, N.J. 07670, and Joseph M. Kelley, 1321 E. Broad St., Westfield, N.J. 07090
Filed Jan. 23, 1967, Ser. No. 611,136
Int. Cl. C08f 3/02, 45/62, 45/60
U.C. Cl. 260—45.75           3 Claims

ABSTRACT OF THE DISCLOSURE

Polymeric compositions that contain a dual primary antioxidant system of a hydroxybenzyl phosphonate and a substituted 1,3,5-triazine and a dual ultraviolet absorption system of a nickel chelate and a substituted 2-(2'-hydroxy-phenyl)chlorobenzotriazole have greater stability after extended outdoor exposure than polymeric compositions that contain the dual ultraviolet absorption system alone.

BACKGROUND OF THE INVENTION

Filed of the invention

This invention relates to polymeric compositions containing a solid polyolefin and a stabilizer system for protection against degradation caused by exposure to heat, oxygen and ultraviolet (UV) light. More particularly, it relates to solid substantially crystalline polypropylene and polyethylene compositions containing synergistic stabilizer systems for indoor and outdoor use.

The compositions of this inveniton find use in injection molded articles and monofilament and multifilament fibers which are subjected to photo and thermal oxidation. The polymeric compositions of this invention find particular end product applications in automobile seat covers, draperies, curtains, upholstery fabrics, lawn chair webbing, carpeting, automobile dashboard components and automobile kick panels.

The tendency of polyolefins to deteriorate under the influence of the UV light present in sunlight and elevated temperatures is evidenced by increased brittleness and decreased elongation under tensile stress. Thus, the polyolefins used in the applications listed above should contain a balanced system of antioxidants and UV absorbers.

Description of the prior art

Prior art antioxidants are available which improve the oxidative stability of polyolefins against the deterioration under the influence of high temperatures (see U.S. Patent 3,115,466). Single systems of prior art UV absorbers are available which contain metal chelates such as nickel phenolates for stabilizing polyolefins against the deterioration under the influence of UV light (see U.S. Patents 2,971,940, 2,971,941 and 3,006,886). Dual UV absorption systems containing a nickel chelate, i.e., a nickel amine of a thiobisphenol, ave been taught by the art to improve the UV stability of polyolefins (see U.S. Patent 3,218,294) over that of single absorber systems. A combination of a single UV absorption system and a single antioxidant system has been taught which improves the stability of polyolefins against UV light and heat degradation (see U.S. Patents 3,167,526 and 3,224,667). It is known to add a synergist such as dilauryl thiodipropionate or distearyl thiodipropionate to a single UV absorption system containing a 2-(2'-hydroxy-phenyl) chloro-benzotriazole and a single primary antioxidant system containing a substituted 1,3,5-triazine (see U.S. Patent 3,205,193). However, none of the prior art additive systems for polyolefins have been found which combine a dual primary antioxidant system with a dual UV absorption system. The combination of such systems in accordance with the present invention results in a synergistic effect such that the strength and elongation characteristics after the combination has been exposed to UV light for an extended period of time are greater than those of combinations containing the dual UV absorption system alone without the dual primary antioxidant system. This is indeed surprising in view of the fact that many primary antioxidant systems available in the market today tend to reduce the efficiency of the UV absorber.

SUMMARY OF THE INVENTION

An object of the present invention is to provide a polyolefin containing a balanced stabilizer system to improve the heat and UV light stability of the polyolefin.

Another object of this invention is to provide a polyolefin containing a dual primary antioxidant system and a dual UV absorption system which shows a synergistic effect with respect to the strength and elongation characteristics of the polyolefin.

The present invention provides a polymeric composition comprising a solid polyolefin and a stabilizer composition containing a hydroxybenzyl phosphonate, a substituted 1,3,5-triazine, a nickel chelate and a substituted 2-(2'-hydroxy-phenyl)chloro-benzotriazole.

The hydroxybenzyl phosphonate is contained in the composition of the present invention in amounts in the range of about 0.01 to 1% based on the weight of the polyolefin and has the following formula:

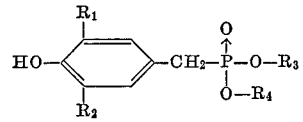

wherein each of $R_1$ and $R_2$ is an alkyl group having 4 to 8 carbon atoms and each of $R_3$ and $R_4$ is an alkyl group having 16 to 20 carbon atoms.

The substituted 1,3,5-triazine is contained in this composition in amounts in the range of about 0.01 to 1% based on the weight of the polyolefin and has the following formula:

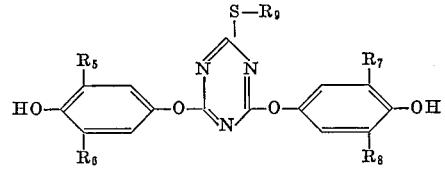

wherein each of $R_5$, $R_6$, $R_7$ and $R_8$ is an alkyl having 4 to 8 carbon atoms and $R_9$ is an alkyl group having 6 to 10 carbon atoms.

The nickel chelate is contained in this composition in amounts in the range of about 0.05 to 5% based on the weight of the polyolefin and consists of a nickel phenolate of a bis-(p-alkylphenol)monosulfide or a nickel amine of a 2,2'-thiobis(p-alkylphenol) or mixtures thereof. Each of the alkyl groups in the nickel chelate contains about 2 to 12 carbon atoms.

The 2-(2'-hydroxy-phenyl)chloro-benzotriazole is contained in this composition in amounts in the range of about 0.05 to 5% based on the weight of the polyolefin and has the following formula:

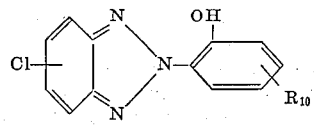

wherein $R_{10}$ is at least one alkyl group having 1 to 6 carbon atoms. The preferred alkyl group is t-butyl.

BRIEF DESCRIPTION OF THE DRAWINGS

The present invention will be more readily understood and further objects and advantages thereof will be more apparent when read in conjunction with the accompanying drawings in which.

THE PREFERRED EMBODIMENTS OF THIS INVENTION

Figure 1:
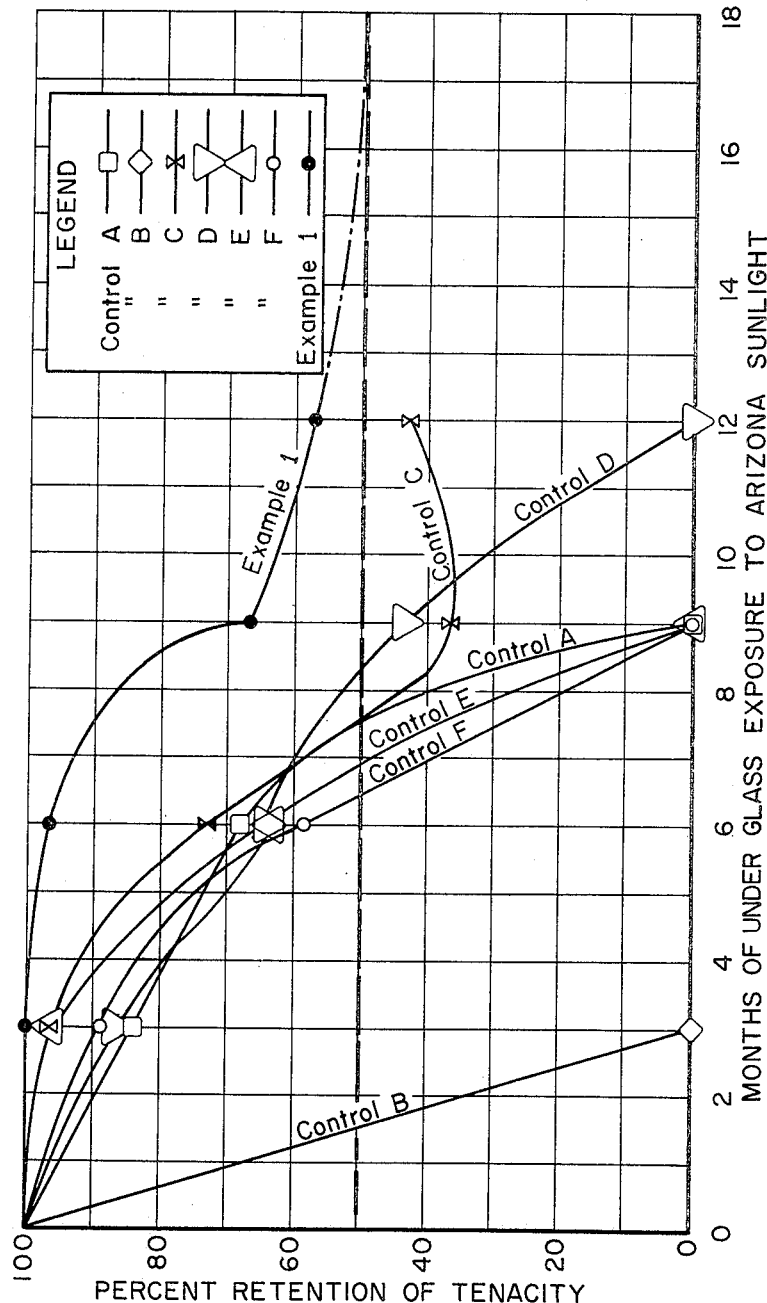
FIG. 1 is a plot of the percent retention of tenacity for each of the compositions of this invention and the control samples versus the months of under glass exposure to Arizona sunlight.

The preferred hydroxybenzyl phosphonate is dioctadecyl 3,5-di-t-butyl-4-hydroxybenzyl phosphonate (hereinafter referred to as the hydroxybutyl phosphonate) and is added to the composition in amounts of about 0.05 to 0.5% based on the weight of the polyolefin. This additive compound can be obtained in commercial quantities in the form of a white crystalline powder having a melting point in the range of about 52° to 57° C.

The preferred 1,3,5-triazine is 2,4-bis-(3,5-di-t-butyl-4-hydroxyphenoxy) - 6-(n-octylthio)-1,3,5-triazine (hereinafter referred to as the 1,3,5-triazine) and is in the composition in amounts of about 0.05 to 0.5% based on the weight of the polyolefin. This additive compound can be commercially obtained in the form of a white crystalline powder and can be prepared in a manner set forth on column 5, lines 26 through column 6, line 18 of U.S. 3,205,193.

The weight ratio of the hydroxybenzyl phosphonate to the 1,3,5-triazine should be in the range foom 0.2 to 2 preferably in the range from about 1 to 1.5. Although the amount of each of these antioxidants may exceed 1% of the weight of the polyolefin, it has been found that higher amounts do not sufficiently increase the desired properties of the composition to warrant the extra cost of the incremental amounts. In fact, amounts in excess of 2% decrease the desired properties of the composition.

The preferred nickel chelates are in the composition in amounts of about 0.1 to 1% based on the weight of the polyolefin and include one or more of the following:

(a) The nickel phenol-phenloate of o,o'-bis-(p-octylphenol)monosulfide, (b) The nickel phenol-phenolate of o,o'-bis-(p-nonylphenol)monosulfide, (c) The nickel phenol-phenolate of o,o'-bis-(p-1,1,3,3-tetramethylbutylphenol)monosulfide, and (d) Nickel butylamine-[2,2' - thiobis(4-t-octyl-phenolato)].

UV absorbers (a) through (c) above can be prepared in the manner set forth in U.S. Patents 2,971,940 and 2,971,941. The preferred mixture of nickel phenol-phenolates can be purchased under the trademark AM 101.

The UV absorber (d) above can be prepared in the manner set forth in U.S. Patent 3,218,294, see especially Example I starting at column 4, line 18, and can be purchased under the trademark Cyasorb UV 1084.

The preferred substituted 2-(2'-hydroxy-phenyl)chloro-benzotriazole includes 2-(2'-hydroxy-5'-t-butylphenyl)-5-chloro-benbzotriazole, 2-(2'-hydroxy-3'-methyl-5'-t-butyl-phenyl)-5-chloro-benzotriazole, 2-(2'-hydroxy-phenyl-3',5(-di-t-butyl)-5-chloro-benzotriazole and mixtures thereof and is in this composition in amounts of about 0.1 to 1% based on the weight of the polyolefin. The 2-(2'-hydroxy-phenyl-3',5'-di-t - butyl) - 5 - chloro - benzotriazole (hereinafter referred to as the chloro-benzotriazole) is preferred and can be obtained in commercial quantities in the form of a yellow crystalline powder having a melting point in the range of 154° to 158° C.

The polyolefins in the polymeric compositions of this invention include such mono-olefinic resins as polyethylene, polypropylene, polybutylenes, poly-4-methyl pentene-1 and copolymers of these such as ethylene-propylene copolymers. In the case of the monofilament and multifilament fiber application, the preferred polyolefin is a solid substantially crystalline polypropylene which has a minimum heptone insolubility of 70%. It is more preferable that the polypropylene have a heptane insolubility of at least 80% to assure sufficient crystallinity for the desired use in fibers. The compositions of this invention can also contain optional ingredients such as pigments, delustrants, plasticizers, flame retardant materials, antistatic agents and other materials known in the art. These compositions can even contain other plastics blended with the polyolefin.

The following examples are given to illustrate the invention and are not intended to limit its scope thereof. All percentages of the constituents making up the compositions of the controls and examples are based on the weight of polypropylene.

Examples 1 and 2

These examples illustrate the improvement in the UV light stability of the compositions of the present invention over compositions which do not contain the dual primary antioxidant system and the dual UV absorption system of this invention.

Commercial polypropylene having a density of about 0.905 to 0.915, a melt flow at 230° C. of about5 gm./10 min. (as measured by ASTM D–1238) and containing about 96% heptane insolubles (as determined by the Bailey-Walker procedure) was mixed with one or more of the following constituents in a dry powder blender until a homogeneous composition was obtained: the hydroxybenzyl phosphonate, the 1,3,5-triazine, the mixture of the nickel phenol-phenolates (AM 101) and the chloro-benzotriazole. The amounts of each of the consituents making up the polypropylene compositions of the controls and examples are as follows:

| Sample Tested | Percent Hydroxy-benzyl phosphonate | Percent 3,1,5-triazine | Percent Nickel Pheno-phenolatles | Percent Chloro-benzotriazole |
|---|---|---|---|---|
| Control A | | | 0.8 | |
| Control B | | | | 0.8 |
| Control C | | | 0.4 | 0.4 |
| Control D | 0.2 | | 0.8 | |
| Control E | | 0.2 | 0.8 | |
| Control F | 0.1 | 0.1 | 0.8 | |
| Example 1 | 0.1 | 0.1 | 0.5 | 0.5 |
| Example 2 | 0.1 | 0.1 | 0.4 | 0.4 |

Each of the resulting polypropylene compositions was then melt extruded and cooled and the resulting clear monofilament fibers were wound onto spools. The size of the extruded fibers was 6 mils (150 denier round).

The control samples and a sample of the compositions of this invention, Example 1, were tested for UV light stability by exposing each of the samples under glass to Arizona sunlight under the controlled conditions of The Desert Sunshine Exposure Test Service of Phoenix, Ariz. These conditions include placing the samples onto test racks with the samples inclined at a 45° angle to the horizon facing south. The glass used in the test racks was ordinary, single strength window glass, which when new transmits over three-fourths of the UV light. The tenacity (grams per denier) and elongation of each of these samples were measured in a Model X-3 Scott Tensile Tester after 3, 6, 9 and 12 month periods and compared to the original sample. These four time periods used in this test correspond to the following UV hours and total Langleys of sunlight (gm. cal./sq. cm.):

| Months | UV Hours | Total Langleys |
|---|---|---|
| 3 | 472 | 42,020 |
| 6 | 887 | 80,438 |
| 9 | 1,216 | 110,764 |
| 12 | 1,583 | 146,280 |

The results expressed in percent retention of tenacity and percent loss in elongation are listed in Table I below:

TABLE I.—UNDER GLASS EXPOSURE TO ARIZONA SUNLIGHT

| Sample Tested | Percent Retention of Tenacity after— | | | | Percent Loss in Elongation after— | | | |
|---|---|---|---|---|---|---|---|---|
| | 3 mos. | 6 mos. | 9 mos. | 12 mos. | 3 mos. | 6 mos. | 9 mos. | 12 mos |
| Control A | 83 | 69 | 0 | 0 | 29.5 | 41.2 | 100 | |
| Control B | 0 | 0 | 0 | 0 | 100 | | | |
| Control C | 95 | 72 | 35 | 43 | 35 | 50 | 60 | 60 |
| Control D | 87 | 62 | 44 | 0 | 40 | 50 | 75 | 100 |
| Control E | 95 | 62 | 0 | 0 | 50 | 59.1 | 100 | |
| Control F | 88 | 57 | 0 | 0 | 18.7 | 37.5 | 100 | |
| Example 1 | 100 | 98 | 67 | 58 | 11.1 | 22.2 | 27.8 | 38.9 |

Referring now to FIG. 1, the percent retention of tenacity data from Table I were plotted against the months of under glass exposure. FIG. 1 shows that the composition of this invention has "staying power," i.e., the ability to retain a high level of its retained tenacity after an initial sharp decrease. Table I and FIG. 1 indicate the overall improvement in the percent retention of tenacity and the decrease in the percent loss in elongation of the composition of the present invention over the composition of the controls. It can be seen from Table I and FIG. 1 that the improvement in the UV stability of the composition of this invention is greater than one would expect from results obtained on the controls containing one or more, but not all of the additives making up the composition of this invention.

The control samples and samples of the compositions of this invention, Examples 1 and 2, were mounted onto a cardboard frame and exposed in a sunshine arc Model XW Atlas Weather-Ometer. The tenacity and elongation of each of these samples were measured in the same manner as described above after the various time periods. The results expressed in percent retention of tenacity and percent elongation for the time periods in hours are listed in Table II below:

TABLE II.—WEATHER-OMETER EXPOSURE

| Sample Tested | Percent Retention of Tenacity after— | | | | | Percent Elongation after— | | | | | |
|---|---|---|---|---|---|---|---|---|---|---|---|
| | 175 hrs. | 300 hrs. | 370 hrs. | 500 hrs. | 660 hrs. | 0 hrs. | 175 hrs. | 300 hrs. | 370 hrs. | 500 hrs. | 660 hrs. |
| Control A | 45 | 29 | | 0 | 0 | 17 | 7 | 4 | | 0 | 0 |
| Control B | 19 | 0 | | 0 | 0 | 20 | 3 | 0 | | 0 | 0 |
| Control C | 84 | 42 | | 23 | 0 | 20 | 12 | 9 | | 6 | 0 |
| Control D | 64 | 0 | | 0 | 0 | 20 | 8 | 0 | | 0 | 0 |
| Control E | 70 | 23 | | 0 | 0 | 18 | 7 | 3 | | 0 | 0 |
| Control F | | | 19 | | | 22 | | | 2 | | |
| Example 1 | | | 67 | | | 18 | | | 10 | | |
| Example 2 | | 76 | | 42 | | 28 | | 14 | | 6 | |
| Control B | 19 | 0 | | 0 | 0 | 20 | 3 | 0 | | 0 | 0 |

Figure 2:
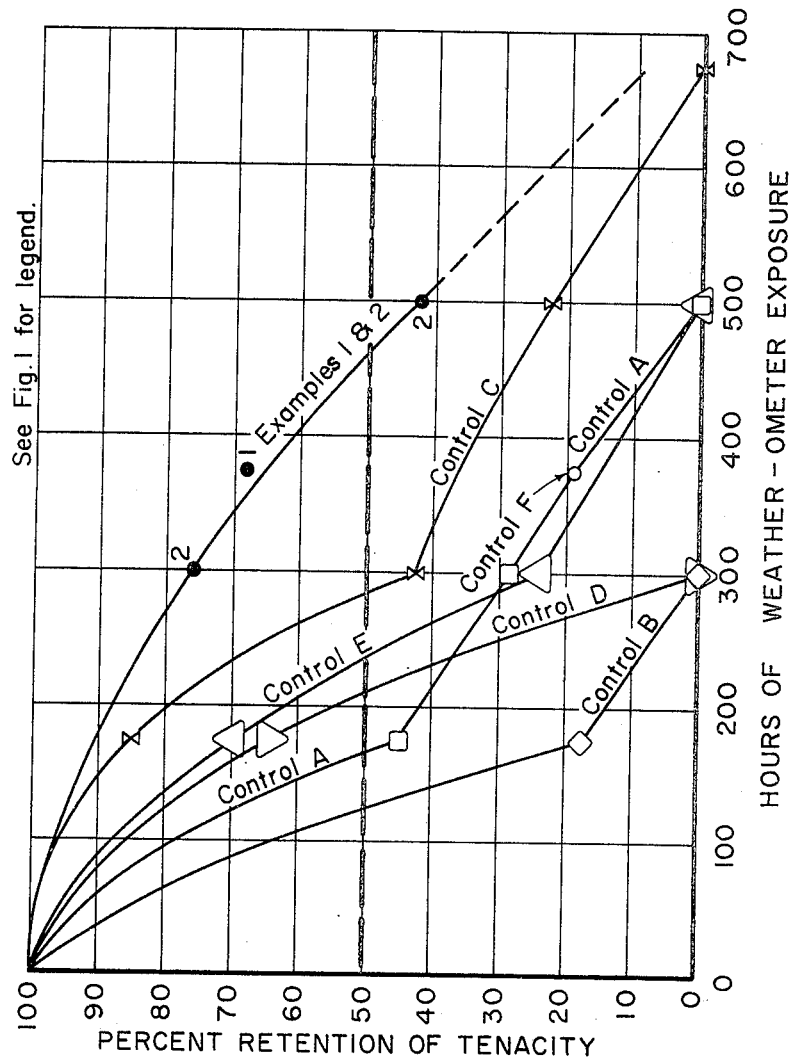
FIG. 2 is a plot of the percent retention of tenacity for each of the various samples versus the hours of exposure in an Atlas Weather-Ometer.

Referring now to FIG. 2, the percent retention of tenacity data of Table II were plotted against hours of Weather-Ometer exposure. Table II and FIG. 2 also indicate that the compositions of this invention have much greater UV light stability than one would expect from the results obtained by the various combinations making up the controls.

To make a comparison between the controls and the examples easier, the results of Tables I and II were expressed in terms of the length of time it took each of the samples tested to reach 50% retention of its tenacity. These data were taken off the broken lines on FIG. 1 and FIG. 2 and are listed in Table III below:

TABLE III

| Sample Tested | Months of Under Glass Exposure to Arizona sunlight to 50% Retention of Tenacity | Hours of Exposure to Weather-Ometer to 50% Retention of Tenacity |
|---|---|---|
| Control A | 8 | 160 |
| Control B | 2 | 120 |
| Control C | 8 | 280 |
| Control D | 8 | 210 |
| Control E | 7 | 230 |
| Control F | 6 | 160 |
| Example 1 | [1] 18 | 460 |
| Example 2 | ([2]) | 460 |

[1] Extrapolated from FIG. 1.
[2] Data not available.

It can also been seen from Table III that the combination of the dual primary antioxidant stabilizer system and the dual UV absorber system of this invention retained at least 50% of its tenacity for a period which was much greater than was obtained by using the composition of the controls. For example, on comparing the results of Controls A, B, and F, one would not expect that adding a second UV absorber, i.e., the chloro-benzotriazole (Control B), to the composition containing the nickel phenol-phenolate UV absorber system and the dual primary antioxidant stabilizer system (Control F) to have any greater UV life than was obtained with the nickel phenol-phenolate system (Control A) by itself. Certainly, one would not expect that adding a dual primary antioxidant to a dual UV-absorber system (Control C) would result in a UV life which is over twice as great as that for the UV-absorber system above. In fact, when a single primary antioxidant was added to the absorber system, the UV life was in many cases less than the UV life without the primary antioxidant, compare Controls D, E and F. These surprising results of the compositions of this invention can only be attributed to a synergistic effect between the dual primary antioxidant system and the dual UV-absorber system of this invention.

EXAMPLE 3

This example illustrates that the compositions of the present invention have high levels of oxidative heat stability.

The 6 mil monofilament fiber samples having the same composition as Example 1 and Controls A through F were placed on layers of cheese cloth and put into a Tholco Model 18 Circulating Air Oven at 116° C. (240° F.). The samples were periodically removed from the oven and measured for tenacity. It was found that after 1200 hours in the forced draft oven the composition of this invention had a 12% increase in its retained tenacity over the retained tenacity of the original sample. In contrast, the Control samples A, B and C without the primary antioxidant had none of its retained tenacity after the 1200 hour period. It was also found that Control samples D, E and F had increases of about 12, 18 and 10%, respectively, after the 1200 hour period in the forced draft oven.

These data indicate that the addition of the dual absorption system to the polypropylene compositions containing the dual antioxidant system does not adversely effect the oxidative heat stability of the composition of this invention. Thus, the compositions of this invention have been found to have a proper balance of stabilizer systems to improve both the heat and the UV stability of the polyolefin.

We claim:
1. A solid substantially crystalline mono-olefinic resin composition containing the following constituents based on the weight of said resin:
   (a) about 0.05 to 0.5% of dioctadecyl 3,5-di-t-butyl-4-hydroxy-benzyl phosphonate;
   (b) about 0.05 to 0.5% of 2,4-bis-(3,5-di-t-butyl-4-hydroxy-phenoxy)-6-(n-octylthio)-1,3,5-triazine;
   (c) about 0.1 to 1% of the nickel phenol-phenolate of o,o'-bis-(p-octylphenol)monosulfide or nickel butyl-amine-[2,2'-thiobis(4-t-octyl-phenolato)], and
   (d) about 0.1 to 1% of 2-(3,'5'-di-t-butyl-2'-hydroxy-phenyl)-5-chloro-benzotriazole.

2. The composition of claim 1 wherein said resin is polyethylene.

3. The composition of claim 1 wherein said polyolefin is polypropylene.

References Cited

UNITED STATES PATENTS

| | | | |
|---|---|---|---|
| 2,971,941 | 2/1961 | Fuchsman et al. | 260—45.75 |
| 3,167,526 | 1/1965 | Nicholson | 260—45.75 |
| 3,215,717 | 11/1965 | Foster | 260—439 |
| 3,224,973 | 12/1965 | Knapp | 260—45.95 |
| 3,245,992 | 4/1966 | Dexter | 260—45.8 |
| 3,280,070 | 10/1966 | Battista et al. | 260—45.85 |
| 3,284,387 | 11/1966 | Cantatore et al. | 260—45.8 |

OTHER REFERENCES

Crystalline Olefin Polymers, Part II—vol. XX of the series "High Polymers," by Raff and Doak, Interscience Publishers, New York, 1964, pp. 363, 369 and 373.

DONALD E. CZAJA, Primary Examiner

J. P. HOKE, Assistant Examiner

U.S. Cl. X.R.

260—45.8, 45.95

PO-1050
(5/69)

UNITED STATES PATENT OFFICE
CERTIFICATE OF CORRECTION

Patent No. 3,481,897          Dated December 2, 1969

Inventor(s) Paul J. Marinaccio and Joseph M. Kelley

It is certified that error appears in the above-identified patent and that said Letters Patent are hereby corrected as shown below:

Page 1, column 1, line 7, after 07090 insert "assignors to Dart Industries Inc., Los Angeles, California, a corporation of Delaware".

SIGNED AND
SEALED
MAY 26 1970

(SEAL)
Attest:

Edward M. Fletcher, Jr.
Attesting Officer

WILLIAM E. SCHUYLER, JR.
Commissioner of Patents